US006208103B1

(12) United States Patent
Kachouh

(10) Patent No.: US 6,208,103 B1
(45) Date of Patent: Mar. 27, 2001

(54) ELECTRIC MOTOR-OPERATED ACTUATOR FOR A MOTOR VEHICLE LOCK

(75) Inventor: Checrallah Kachouh, Dortmund (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/337,398

(22) Filed: Jun. 22, 1999

(30) Foreign Application Priority Data

Jun. 22, 1998 (DE) ........................................ 198 27 751
Jul. 17, 1998 (DE) ........................................ 198 32 170

(51) Int. Cl.7 ........................................ G05B 5/00
(52) U.S. Cl. ........................ 318/468; 292/245; 70/192
(58) Field of Search ........................ 318/466–468, 318/282, 283, 286; 292/201, 244, 245, 144, 216; 70/190, 192, 271, 278.7, 373, 277

(56) References Cited

U.S. PATENT DOCUMENTS

| | | | | |
|---|---|---|---|---|
| 4,342,209 | * | 8/1982 | Kleefeldt | 70/264 |
| 4,518,181 | | 5/1985 | Yamada | 292/201 |
| 4,850,625 | * | 7/1989 | Hori et al. | 292/336.3 |
| 4,926,707 | | 5/1990 | Yamada | 74/96 |
| 5,240,296 | | 8/1993 | Kobayashi | 292/201 |
| 5,638,712 | * | 6/1997 | Kuroda | 70/268 |
| 5,667,260 | * | 9/1997 | Weyerstall | 292/201 |
| 5,673,578 | | 10/1997 | Roos | 70/264 |
| 5,680,783 | * | 10/1997 | Kuroda | 70/277 |
| 6,032,496 | * | 3/2000 | Weyerstall et al. | 70/1.5 |

FOREIGN PATENT DOCUMENTS

| | | |
|---|---|---|
| 195 17 525 | 11/1995 | (DE) . |
| 44 39 479 | 5/1996 | (DE) . |
| 0 342 099 | 11/1989 | (EP) . |
| 2 204 351 | 11/1988 | (GB) . |

* cited by examiner

*Primary Examiner*—Robert E. Nappi
*Assistant Examiner*—Rina I. Duda
(74) *Attorney, Agent, or Firm*—Nixon Peabody LLP; David S. Safran

(57) ABSTRACT

An electric motor-operated actuator for a motor vehicle lock is provided which permits manual activation in a very wide range of operation. The actuator includes a control crank formed by an outer and an inner guide cam which, over a considerable angular range, have a radial distance from one another which corresponds roughly to the radial distance from an inner stop and an outer stop to allow free manual switching of the control lever between two operating states. The guide cams which form the control crank have radii which change only in a relatively small angular range for purposes of displacement of the control lever, and therefore have a relatively large rise. Preferably, the actuator is overall self-locking.

13 Claims, 4 Drawing Sheets

ELECTRIC MOTOR-OPERATED ACTUATOR FOR A MOTOR VEHICLE LOCK

BACKGROUND OF THE INVENTION

1. Field of the Invention

The invention relates to an electric motor-operated actuator for a motor vehicle lock, e.g. door lock, rear hatch lock, hood lock.

2. Discussion of Related Art

A conventional electric motor-operated actuator for a motor vehicle lock is disclosed in U.S. Pat. No. 4,518,181 in conjunction with a comprehensive description of a motor vehicle side door lock. This patent points out that an actuator pulley is any functional component which has a corresponding actuator function. This also applies in the present case. In the prior art, as alternatives, there is one actuator pulley on the one hand for radial movements and one actuator cylinder with the cylinder axis as the axis of rotation for axial movements.

The known electric motor-operated actuator for a motor vehicle lock includes a control crank which runs in a spiral in the actuator pulley, by a notably small drive output of the electric drive motor. In end positions, which correspond to the inner stop or the outer stop of the control crank, manual switching between the operating states "unlocked" and "locked" can be done without hindrance. The number of components is small, both in radial and axial movement of the control lever by the control crank. The stop running against the guide element journal) can trigger the shutoff of the electric drive motor (block mode).

Because the control crank extends between the inner stop and the outer stop via a guide channel which is closed at a minimum of more than 360° for the journal of the control lever and is closed only in the overlap between the inner stop and outer stop with a transverse channel which extends radially or axially, to enable manual switching, the actuator itself does not require a tilt spring which loads the control lever. In this way, motor output becomes especially low. In any case, in this prior art, a tilt spring, which is designed at least as a weak spring, is feasible for the control lever in order to achieve defined operating states.

The closed guide channel, which is formed by the control crank over the latter's entire length, disadvantageously only permits manual switching in the end position, and precludes manual switching in between. When the electric drive motor fails, the control lever is blocked. Since the rise of the control crank over 360° is relatively low, when a conventional small diameter of the actuator pulley of a few centimeters must be accepted, in conventional overall gearing down, the actuator is self-locking and therefore cannot be turned back by hand.

The above described problem has already been recognized in the above explained prior art. A second embodiment includes a construction in which the control crank extends between the inner stop and the outer stop likewise again over a minimum of more than 360°. However, the control crank is no longer made as a closed guide channel for the journal of the control lever, but as the outer and inner guide cams. The choice of radii of the outer and inner guide cams is made such that only an angular area of roughly 180° each has a changing radius with which the journal is then displaced radially to the inside or to the outside. These areas on the outer guide cam and on the inner guide cam do not overlap one another. By means of the respective guide cam on which the journal is held in a defined manner by a tilt spring, the journal is moved to the inside or outside by turning the actuator pulley until the tilt spring turns over and shifts the control lever into the respective other operating state. This shifting movement, not the journal striking the inner stop or the outer stop, shuts off the drive motor by means of a switching contact. Afterwards, a reset spring takes effect by acting in both directions and always returning the actuator pulley with the control crank to a middle position in which the journal on the control lever is located in the widest section of the control crank. In the middle position, manual switching between the operating states "unlocked" and "locked" is easily possible.

In a second embodiment of the above-described prior art, the actuator is not self-locking, but can be reset. The reset spring which is present for resetting, however, requires a significantly increased drive output of the electric drive motor. Turning the actuator pulley back by hand when the electrical drive motor fails is not described, but is generally not necessary either due to the reset spring. This second prior art embodiment, in addition to the high drive output of the electric drive motor, has the further disadvantage that the control lever actually turns over under the action of the tilt spring. Therefore, the control lever is not guided beyond the tilt point of the tilt spring by the control crank which is made as a closed guide channel. The noise generated is thus higher than in the first prior art embodiment.

SUMMARY OF THE INVENTION

The object of the invention is to combine a drive output of the electric drive motor in as compact a manner as possible with an area of manual switchability as wide as possible in an emergency, but in doing so to keep the design of the actuator as simple as possible. The aforementioned object is achieved by providing an electric motor-operated actuator for a motor vehicle lock, the motor vehicle lock having a lock mechanism which can be switched between operating states of at least one of "unlocked" and "locked"; "unlocked" and "locked-antitheft"; and "unlocked", "locked" and "locked-antitheft", comprising a drive motor, an actuator pulley rotary driven by the drive motor, and a control lever loaded with a tilt spring and dynamically coupled to the actuator pulley for switching the lock mechanism into the various operating states. The actuator pulley has a control crank which extends in a curve around an axis of rotation of the actuator pulley. The control crank includes a closed inner guide cam and a closed outer guide cam with changing radii of a guide channel. The control crank also includes on one end an inner stop near the axis of rotation and on another end an outer stop away from the axis of rotation. The control lever has a guide element which fits into the control crank. In addition, the control lever is adapted to be switched via the guide element by the control crank into the operating states which are attained when one of the inner stop and the outer stop touch the guide element. The control lever is capable of being manually switched back and forth between two operating states at least in one end position of the actuator pulley with the guide element on at least one of the inner stop and the outer stop. The drive motor is adapted to be turned off when at least one of the inner stop and the outer stop contacts the guide element. Moreover, the guide element and the corresponding stop as adapted to pause in the attained end position after the drive motor is turned off. The guide channel, in only a partial angular range, forms the control crank for displacing the control lever. Another partial angular range of the guide channel and the control crank forms the inner and outer guide cam having a radial distance from one another which corresponds roughly to the radial distance from the inner stop and the outer stop to allow free manual switching of the control lever between the two operating states. Preferably, the actuator is totally self-locking. This approach relates to radial movements with the implementation of an actuator pulley. However, axial movements in an otherwise equivalent actuator cylinder may also be used using an actuator cylinder.

The arc length of the closed guide channel is largely shortened as a section of the control crank to an amount which implements the desired stops, but which allows the switching function for manual switching over an angular range as large as possible. In this case, pretensioning of the spring for the actuator pulley is not necessary in spite of the wide range of manual shifting capacity. In a simple manner, a relatively weak tilt spring can be provided for the control lever, so that it retains a defined location on the inner or outer guide cam of the control crank outside the closed guide channel.

Within the framework of the present invention, it does not matter how the motion of the control lever, which is triggered by the actuator pulley or the actuator cylinder, is transferred into the remaining lock mechanism. To do this, a host of alternatives are available which are known from the prior art. Various alternatives also apply to the direction of motion of the control lever which can therefore be swivelled not only by the control crank, but can also be moved linearly.

The electric motor-operated actuator of the present invention may also include the especially simple implementation of the "locked-antitheft" operating state by means of a trap pocket. This can be advantageously used in all types of actuators of this fundamental principle.

DETAILED DESCRIPTION OF THE INVENTION

Figure 1:
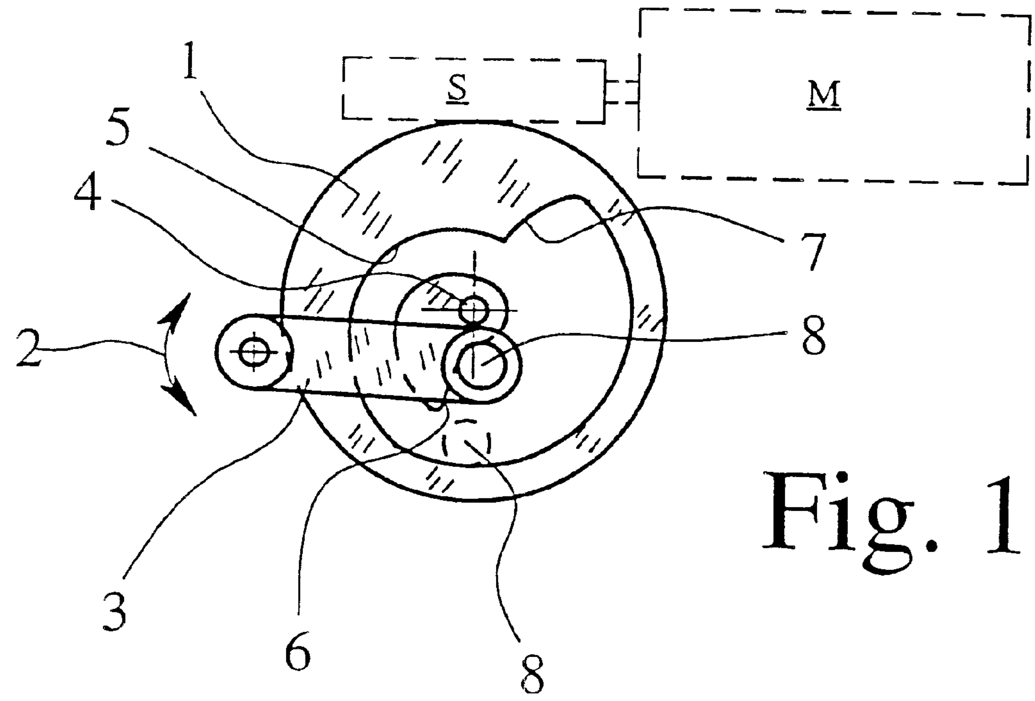
FIG. 1 is a schematic of an electric motor-operated actuator of the present invention for a motor vehicle lock with the control lever on the inner stop.

The first embodiment of an electric motor-operated actuator of the present invention, which is shown in FIG. 1, relates to a motor vehicle lock with a lock mechanism which can assume two operating states, "unlocked" and "locked". An electric drive motor M with a drive element, i.e. a spindle S, is shown by the broken lines. For the electric motor-operated actuator, the actuator pulley 1, which can be rotary driven by the drive motor, is important. The actuator pulley 1 is dynamically coupled to a control lever 3 which is loaded, in this embodiment, with a tilt spring 2 in order to switch the lock mechanism into the various operating states. The tilt spring 2 is indicated by a double arrow which at the same time shows the switching directions of the control lever 3. Although the actuator pulley 1 represents an especially preferred configuration, the teaching of the present invention can also be used in other types of actuator elements.

Figure 2:
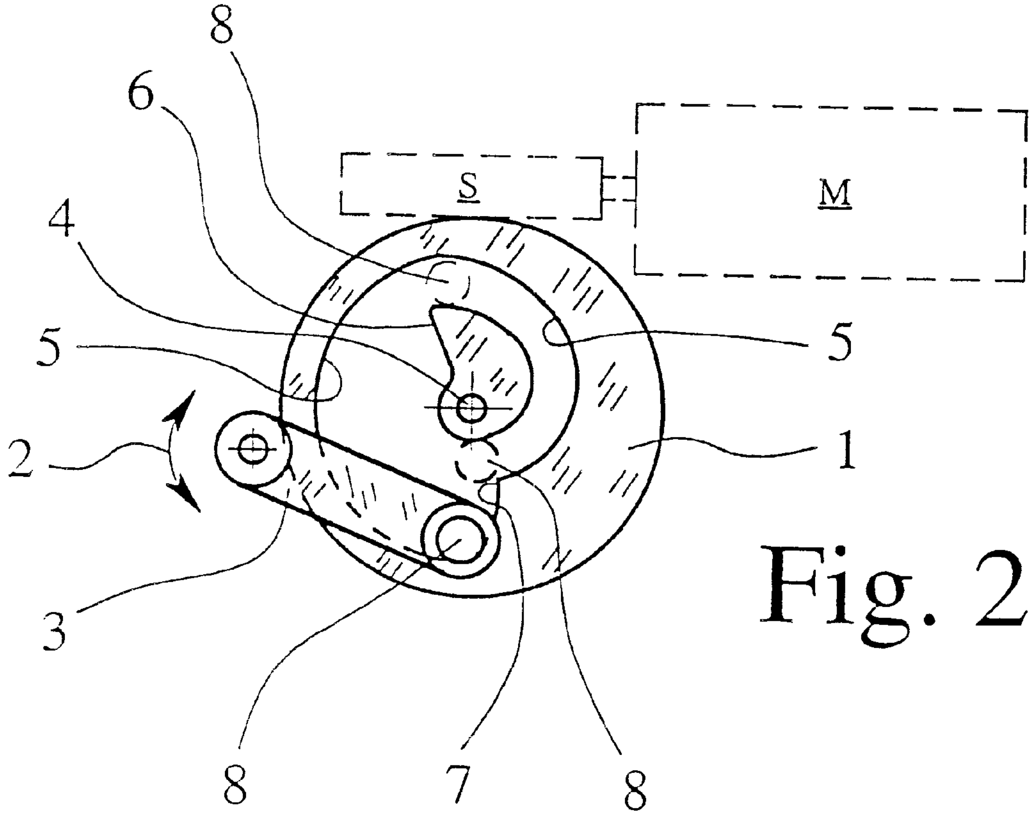
FIG. 2 is a schematic of the actuator of FIG. 1 with the control lever on the outer stop.

The actuator pulley 1 has a control crank 5 which extends in a curve around its axis of rotation 4. The control crank 5 includes, on one end, an inner stop 6 near the axis of rotation 4 and, on the other end, an outer stop 7 away from the axis of rotation 4. The control lever 3 has a guide element 8 for example, a journal, which fits into the control crank 5. The control lever 3 can be switched via the guide element 8 by the control crank 5 into the two operating states which are shown in FIGS. 1 and 2. FIG. 1 shows the switched state "unlocked" on the inner stop 6 while FIG. 2 shows the switched state "locked" on the outer stop 7. Alternatively, the assignment of states can be made the opposite. As explained, a journal 8 for the control lever 3 need not necessarily accomplish the coupling for the control crank 5, but other coupling means known from the prior art could be used. Therefore, as the general concept, guide element 8 has been chosen. Likewise, in the following description, the journal 8 is often discussed because the guide element 8 in the embodiment is likewise made as a journal.

The assignment of the components may be reversed with one or two guide elements 8 on the actuator pulley 1 and two or one stops 6, 7 on the control lever 3. The remaining configuration must then, of course, be adapted accordingly.

The embodiment which is shown in FIGS. 1 and 2 illustrates that the control lever 3 can be manually switched back and forth in the two end positions of the actuator pulley 1 freewheeling between the two operating states. The stops 6, 7 are made such that the journal 8 of the control lever 3 is easily detached from stop 6, 7 by manual movement and can be turned over into the other operating position which switches the other operating state of the lock mechanism. Comparison of FIGS. 1 and 2 illustrates that overturning into the other operating state moves the control lever from one stop 6 or 7, not to the other stop 7 or 6, but only into a swivel position which corresponds to the swivel position upon contact with the other stop 7 or 6. This is illustrated in the other operating position by the journal 8 which is shown by the broken line in FIGS. 1 and 2.

This embodiment results in the triggering of the electric drive motor being especially simple. While a switching process turns the drive motor on, for example by an electronic control of the motor vehicle locking system, the electric drive motor is turned off when the inner stop 6 or the outer stop 7 makes contact with the journal 8. To do this, a current rise is evaluated and optionally a timing circuit is also used. Implementation of the so-called "block mode" makes the use of other switches unnecessary. It is significant that there is no reset spring for the actuator pulley 1, but that the journal 8 and the corresponding stop 6 or 7 essentially pause in the attained end position after the drive motor is turned off (aside from small correction movements by inherent elasticities, etc).

As a comparison of FIG. 1 and FIG. 2 shows, the sole required spring loading for the control lever 3 is a comparatively weak tilt spring 2 or similar device which simply prevents the control lever 3 from being able to unintentionally leave the position on the outside radius (outer guide cam 5') or on the inside radius (inner guide cam 5") of the control crank 5. In spite of the fact that only little spring force need be overcome by the electric drive motor, the actuator construction is such that there is a very wide range of manual switching capacity.

When the electric drive motor is inoperative, the actuator can be manually switched between operating states not only in the end positions, but also in a wide angular range of intermediate positions. Also, when the drive motor fails, therefore, manual actuation will be possible with the greatest probability.

In the electric motor-operated actuator of the present invention, there is therefore no reset spring for the actuator pulley 1. As a result, the electric drive motor can operate with a low drive output. To accomplish wide manual switchability, the control crank 5 is formed by an outer 5' and an inner 5" guide cam which over a considerable angular range have a radial distance from one another which corresponds roughly to the radial distance from the inner stop 6 and the outer stop 7. The cams allow free manual switching of the control lever 3 between the two operating states. Also, the guide cams, which form the control crank 5, have radii which change only in a relatively small angular range for purposes of displacement of the control lever 3 and thus have a relatively large rise.

Manual resetting can take place, even if against greater mechanical resistance, if necessary even within a section of the control crank 5 which is formed as the guide channel, because preferably the actuator is not made self-locking, since specifically the rises of the guide cams which form the control crank 5 have been chosen to be accordingly large with respect to the journal 8 on the control lever 3.

Since there is a second transformation stage with the control crank 5 in the actuator pulley 1, the transformation on the first stage from the actuator pulley 1 to the spindle S can be less than if the entire transformation ratio would have to be accomplished there alone. This has the advantage that the actuator pulley 1 turns comparatively rapidly and results in a short setting time. Another advantage is the relatively low load on the journal 8 and the bearing when the actuator pulley 1 runs against the journal 8.

The preferred embodiment which is shown in FIGS. 1 and 2 is furthermore characterized by the inner stop 6 and the outer stop 7 being clearly angularly offset with respect to the axis of rotation 4 of the actuator pulley 1; by the journal 8 of the control lever 3 between the inner stop 6 and the outer stop 7 traversing a primary angular range of essentially more than 360° to 660° and thus traversing a part of the control crank 5 twice; by the control crank 5 being made as a closed guide channel only roughly in a residual angular range which remains at 720°; by the guide cams which form the control crank 5 having their changing radii in the section of the control crank 5 which is made as a closed guide channel; and by the control lever 3 having the capacity to be manually switched back and forth between the two operating states in the area outside the section of the control crank 5 which is made as the guide channel.

Continuing to guide the control crank 5 over an angle of more than 360° yields an open area of the control crank 5, while the closed guide channel is returned to a smaller residual angular range. This is sufficient to accomplish the necessary radial displacement of the journal of the control lever 3, but however clears the remaining area for manual switchability of the control lever 3.

The underlying teaching of the invention could be accomplished with the arrangement of the inner stop 6 and the outer stop 7, which is known from the prior art, at an angular distance of roughly more than 360°. Then there would be hardly any overlapping of the rise segments of the guide cams of the control crank 5. This overlapping, especially in the implementation in a guide channel over a certain angular range, however, creates a larger free space for manual switching. In addition, it results in the journal 8 being guided in the guide channel during displacement such that the overturning noise is almost as low as in the alternative to the prior art which forms the starting point for the teaching of the present invention.

The journal 8 in part traversing the control crank 5 twice means, in other words, that the control crank 5 in terms of action extends over a correspondingly larger angular range of much more than 360° to 660°. This is an interpretation simply viewed from another angle. The embodiment illustrated in FIGS. 1 and 2 shows that the inner stop 6 and the outer stop 7 are roughly opposite one another, the primary angular range is thus roughly 540°, and the residual angle range is roughly 180°.

Figure 3:
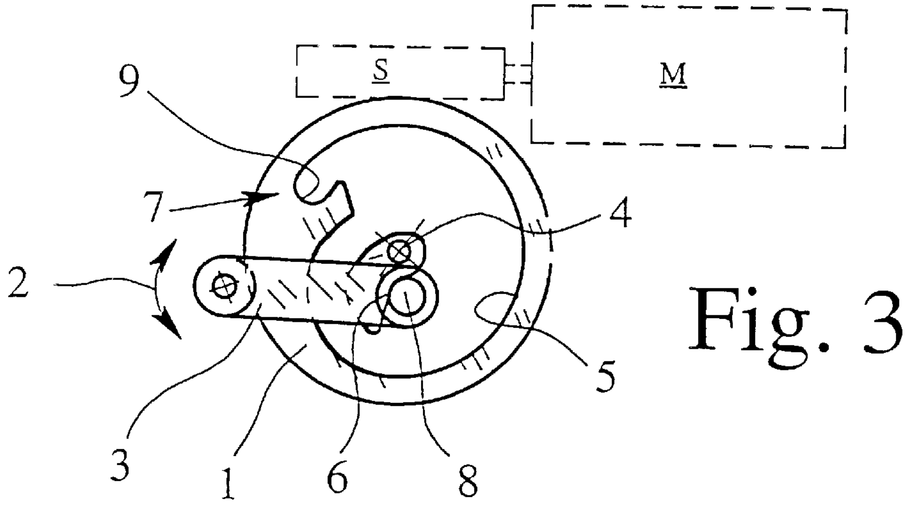
FIG. 3 is a schematic of another embodiment of an electric motor-operated actuator with the control lever on the inner stop.
Figure 4:
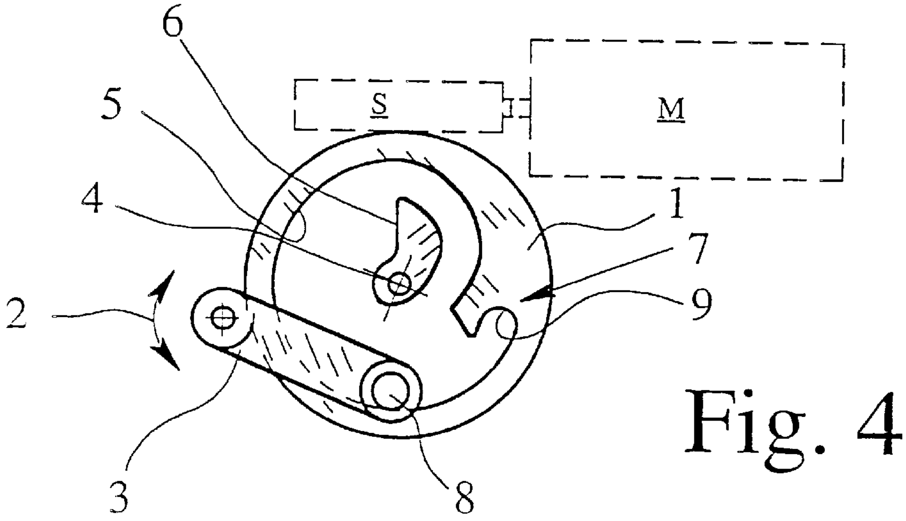
FIG. 4 is a schematic of the actuator of FIG. 3 with the control lever in an intermediate position for the operating state "locked"
Figure 5:
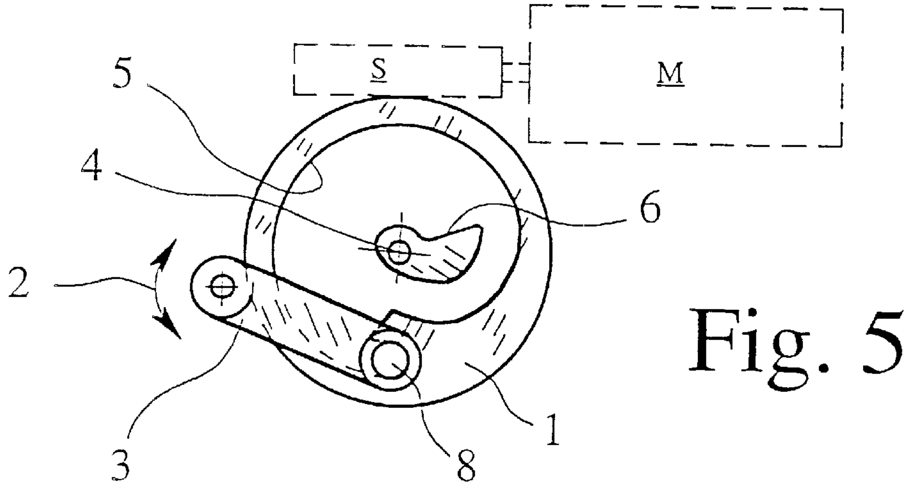
FIG. 5 is a schematic of the embodiment of FIG. 3 with the control lever on the outer stop for implementing the operating state "locked-antitheft"

Conversely, the embodiment shown in FIGS. 3–5 shows that the inner stop 6 and the outer stop 7 are roughly at right angles to one another so that the main angular range is therefore roughly 630° to 650° and the residual angular range is roughly 90° to 70°. In this case, the guide channel, or the residual angular range assumed by the guide channel, is again shortened which further enlarges the angular range in which the control lever 3 can be freely displaced manually.

The embodiment of FIGS. 3–5 further differs from that shown in FIGS. 1 and 2 in that three operating states can be assumed and specifically an additional operating state, "locked-antitheft". To do this, on the outer stop 7 (or on the inner stop 6), the control crank 5 is made as a trap pocket 9 which prevents manual movement of the control lever 3 transversely to the outer stop 7 (or inner stop 6) and thus accomplishes the "locked-antitheft" operating state. This construction can be used to provide beforehand the second operating state "locked-antitheft" as the sole operating state "locked". But three operating states may be provided with the "locked" operating state being defined at a certain angular distance before the "locked-antitheft" operating state by a switching function of the actuator.

In the embodiment of FIGS. 1 and 2, a third operating state "locked-antitheft" can be accomplished, and the assignment of the operating states "locked" and "unlocked" to the stops 6, 7 can remain unchanged. Specifically, the closed guide channel, with a corresponding switching function of the actuator, can be actively used to accomplish the third operating state such that the operating state "locked-antitheft" is defined by a switching function of the actuator which causes the actuator pulley 1 to stop on the end of the section which forms the closed guide channel of the control crank 5 and which faces the stop 6 and 7 which is assigned to the "locked" operating state. In this case, an atypical operating state sequence is chosen; the operating state "locked-antitheft" is not placed "behind" the operating state "locked", but between the operating states "unlocked" and "locked". This operation requires a switch and, moreover, has the drawback that the inevitable overtravel of the electric drive motor itself fluctuates in relatively wide limits in short circuit control. The operating state must therefore have a considerable tolerance which may not always be acceptable.

It is common to the two embodiments that the control crank 5, in the area in which it is not made as a guide channel, runs in a spiral outside as an arc around the axis of rotation 4 as the center with an essentially constant radius and in the section which is made as the guide crank.

It has already been addressed above that the assignment of the journal 8 on the one hand and the inner stop 6/outer stop 7 can be reversed. Instead of the swivel motion of the control lever 3 which is shown in the drawing, it can also be linearly displaced and therefore pushed. This can lead overall to an especially compact configuration because the control lever 3 could possibly also lie transversely over the actuator pulley 1.

Figure 6:
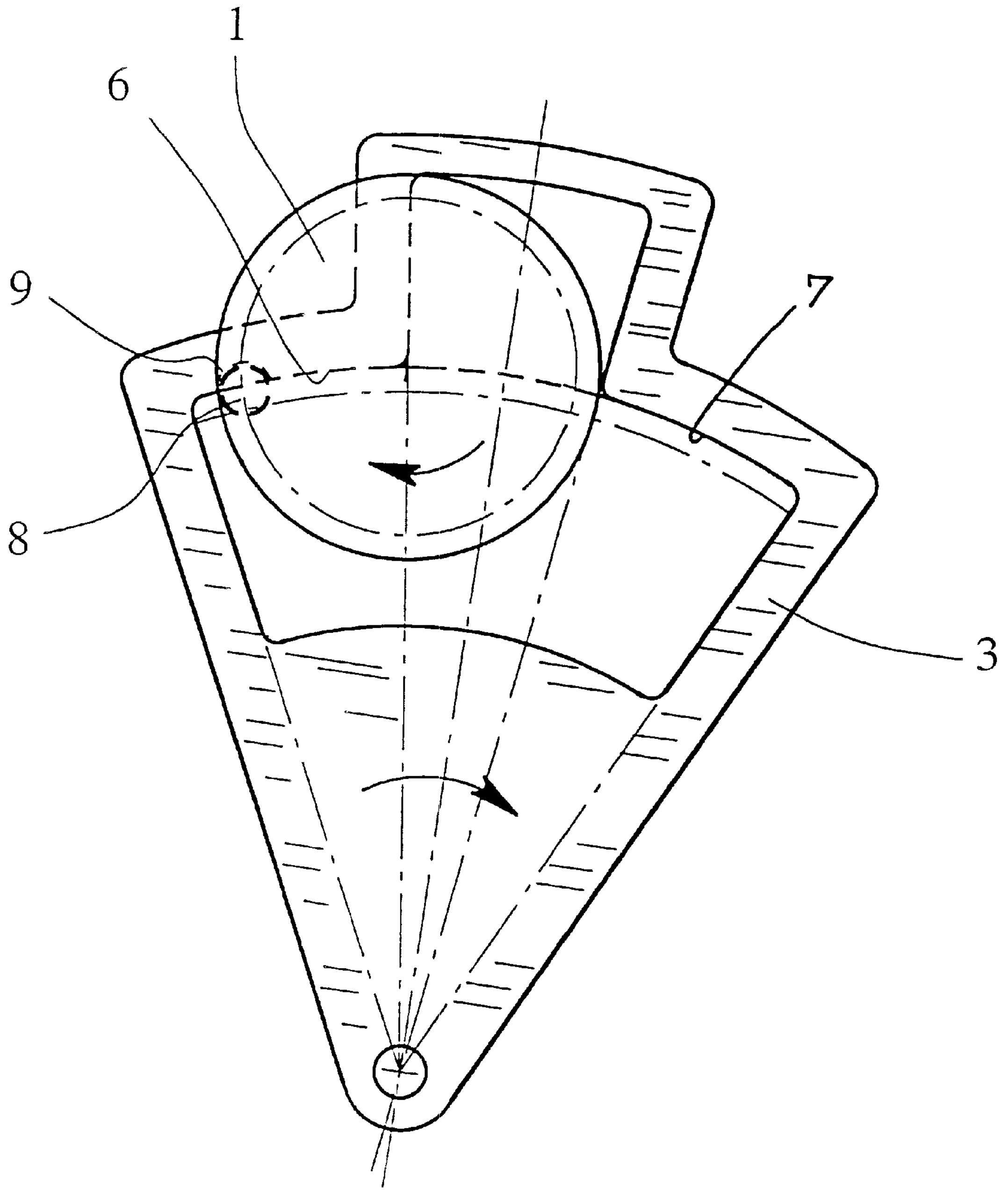
FIG. 6 is a schematic of another embodiment of an electric motor-operated actuator in accordance with the present invention.

The trap pocket 9 which was described above for the embodiment shown in FIGS. 3–5 is also an important independent feature of the present invention. In this respect, FIG. 6 shows an electric motor-operated actuator for a motor vehicle lock which is built entirely differently than the electric motor-operated actuator discussed hereinabove. In this actuator, journal 8, or similar device, is assigned to the drive part 1, likewise made as an actuator pulley, while the control lever 3 carries two stops 6, 7, to the right and left of a motion receiver. In particular, reference should be made to U.S. Pat. No. 5,673,578, where this technology is explained in greater detail. It is simply important here that for the teaching of the present invention that one operating position "locked-antitheft" is likewise accomplished here in an extremely simple manner by a trap pocket 9 on the stop 6. This prevents the control lever 3 from being swivelled when the journal 8 dips into the trap pocket 9 (antitheft function).

Figure 7:
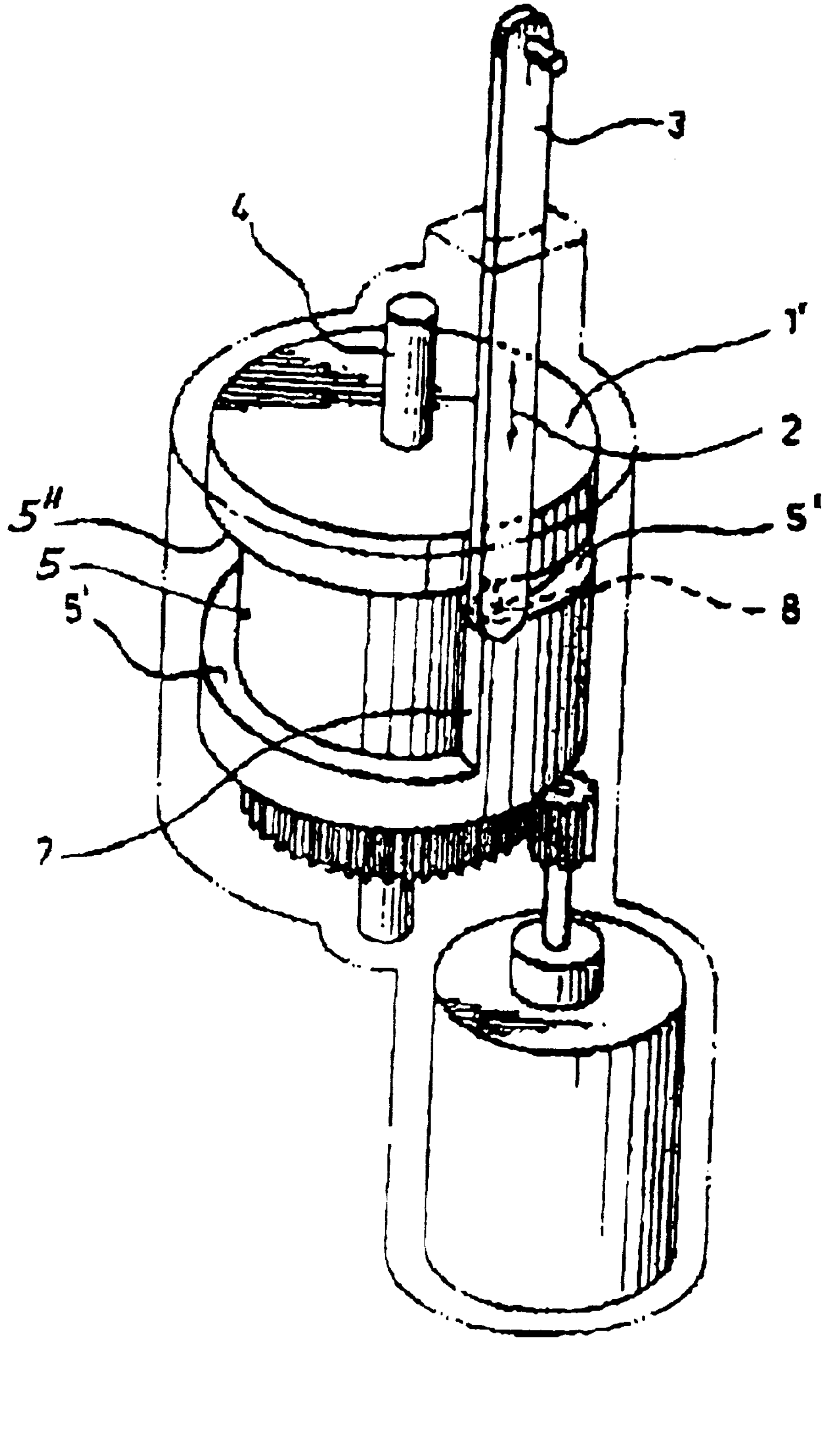
FIG. 7 illustrates another embodiment of a electric motor-operated actuator of the present invention with an actuator cylinder instead of the actuator pulley.

Finally, it applies to the construction of the present invention that all the movements which have been shown radially in the embodiments can also be axially achieved. To do this, instead of the actuator pulley 1, an actuator cylinder 1' is provided including a cylinder axis forming the axis of rotation 4 and the control crank 5 being located on the cylinder jacket. FIG. 7 shows this alternative embodiment with the axially movable control lever 3, which with its journal 8, fits into the control crank 5. The outside stop 7 is clearly illustrated while the inside stop 6 is hidden on the back of the actuator cylinder 1'. For the known features of this embodiment, reference should be made in the corresponding manner to the embodiments of U.S. Pat. No. 4,518,181.

I claim:

1. An electric motor-operated actuator for a motor vehicle lock, the motor vehicle lock having a lock mechanism which can be switched between operating states of at least one of "unlocked"and "locked;" "unlocked" and "locked-antitheft;" and "unlocked," "locked" and "locked-antitheft," comprising:

a drive motor, an actuator pulley rotary driven by the drive motor, and a control lever loaded with a tilt spring and dynamically coupled to the actuator pulley for switching the lock mechanism into the various operating states, the actuator pulley having a control crank which extends in a curve around an axis of rotation of the actuator pulley, said control crank including a closed inner guide cam and a closed outer guide cam with changing radii of a guide channel, the control crank including, on one end, an inner stop near the axis of rotation, and on another end, an outer stop away from the axis of rotation, the control lever having a guide element which fits into the control crank, said control lever adapted to be switched via the guide element by the control crank into the operating states which are attained when one of the inner stop and the outer stop touch the guide element, the control lever being capable of being manually switched back and forth between two operating states at least in one end position of the actuator pulley with the guide element on at least one of the inner stop and the outer stop; wherein the drive motor is adapted to be turned off when at least one of the inner stop and the outer stop contacts the guide element, the guide element and the corresponding stop being adapted to pause in the attained end position after the drive motor is turned off; wherein said guide channel, in only a partial angular range, forms the control crank for displacing the control lever, another partial angular range of the guide channel and the control crank forming the inner and outer guide cam having a radial distance from one another which corresponds roughly to the radial distance from the inner stop and the outer stop to allow free manual switching of the control lever between the two operating states, wherein the actuator is totally self-locking.

2. An electric motor-operated actuator for a motor vehicle lock, the motor vehicle lock having a lock mechanism which can be switched between operating states of at least one of "unlocked"and "locked;" "unlocked" and "locked-antitheft;" and "unlocked," "locked" and "locked-antitheft," comprising:

a drive motor, an actuator cylinder rotary driven by the drive motor, and a control lever loaded with a tilt spring and dynamically coupled to the actuator cylinder for switching the lock mechanism into the various operating states, the actuator cylinder having a control crank which extends in a curve around a cylinder axis as the axis of rotation on the cylinder jacket, the control crank having an inner stop on one end, and on another end, and outer stop spaced away from the inner stop in the axial direction, the control lever having a guide element which fits into the control crank, said control lever being adapted to be switched via the guide element by the control crank into two operating states which are attained when one of the inner stop and the outer stop touch the guide element, the control lever being capable of being manually switched back and fourth between two operating states at least in one end position of the actuator pulley with the guide element on at least one of the inner stop and the outer stop; wherein the drive motor is adapted to be turned off when at least one of the inner stop and the outer stop contacts the guide element, the guide element and the corresponding stop adapted to pause in the attained end position after the drive motor is turned off, said guide channel, in only a partial angular range, forms the control crank for displacing the control lever, another partial angular range of the guide channel and the control crank forming the inner and outer guide cam having an axial distance from one another which corresponds roughly to the axial distance from the inner stop and the outer sop to allow free manual switching of the control lever between the two operating states, wherein the actuator is totally self-locking.

3. The actuator of claim 1, wherein the inner slop and the outer stop arc clearly angularly offset with respect to the axis of rotation of the actuator pulley;

wherein the guide element of the control lever is adapted to traverse a primary angular range of essentially more than 360° to 660° between the inner stop and the outer stop and thus traverses a part of the control crank twice, the control crank being made as a closed guide channel only roughly in a residual angular range which remains from the end of the primary angular range to 720°, the inner and outer guide cams forming the control crank have their changing radii in the section of the control crank which is made as a closed guide channel, and wherein the control lever can be manually switched back and forth between the two operating states in the area outside the section of the control crank which is made as the guide channel.

4. The actuator of claim 3, wherein the inner stop and the outer stop are roughly opposite one another, the primary angular range is thus approximately 540°, and the residual angular range is approximately 180°.

5. The actuator of claim 3, wherein the inner stop and the outer stop are roughly opposite one another, the primary angular range is thus approximately 630° to 650° and the residual angular range is approximately 90° to 70°.

6. The actuator of claim 1, wherein the control crank includes a trap pocket on at least one of the inner stop and the outer stop which prevents manual movement of the control lever transversely to the stop and thus accomplishes the "locked-antitheft" operating state.

7. The actuator of claim 6, wherein the "locked" operating state is defined at a certain angular distance before the "locked-antitheft" operating state by a switching function of the actuator.

8. The actuator of claim 1, wherein the "locked-antitheft" operating state is defined by a switching function of the actuator which causes the actuator pulley to stop on the end of a section which forms the closed guide channel of the control crank and which faces the stop which is assigned to the "locked" operating state.

9. An electric motor-operated actuator for a motor vehicle lock, the motor vehicle lock having a lock mechanism which can be switched between operating states of at least one of "unlocked"and "locked-antitheft," and "unlocked," "locked" and "locked-antitheft," comprising: a drive motor, a driven part driven by the drive motor, and a control lever dynamically coupled to the driven part for switching the lock mechanism into the various operating states, the control lever being able to be manually switched back and forth between two operating states, freewheeling at least in one end position of the driven part, and the drive motor being adapted to be turned off when a journal makes contact with a stop, and the journal and the stop being adapted to pause in an attained end position after the drive motor is turned off; wherein a trap pocket is formed on the stop which prevents manual movement of the control lever transversely to the stop and thus accomplishes the "locked-antitheft" operating state.

10. The actuator of claim 2, wherein the inner stop and the outer stop are clearly angularly offset with respect to the axis of rotation of the actuator cylinder, wherein the guide element of the control lever is adapted to traverse a primary angular range of essentially more than 360° to 660° between the inner stop and the outer stop and thus traverses a part of the control crank twice, the control crank being, made as a closed guide channel only roughly in a residual angular range which remains from the end of the primary angular range to 720°, the inner and outer guide cams forming the control crank have their changing radii in the section of the control crank which is made as a closed guide channel, and wherein the control lever can be manually switched back and forth between the two operating states in the area outside the section of the control crank which is made as the guide channel.

11. The actuator of claim 2, wherein the "locked-antitheft" operating state is defined by a switching function of the actuator which cause the actuator cylinder to stop on the end of a section which forms the closed guide channel of the control crank and which faces the stop which is assigned to the "locked" operating state.

12. The actuator of claim 2, wherein the control crank includes a trap pocket on at least one of the inner stop and the outer stop which prevents manual movement of the control lever transversely to the stop and thus accomplishes the "locked-antitheft" operating state.

13. The actuator of claim 12, wherein the "locked" operating state is defined at a certain angular distance before the "locked-antitheft" operating state by a switching function of the actuator.

* * * * *